No. 887,628. PATENTED MAY 12, 1908.
J. HALL.
STEAMING APPARATUS.
APPLICATION FILED MAR. 21, 1907.
2 SHEETS—SHEET 1.
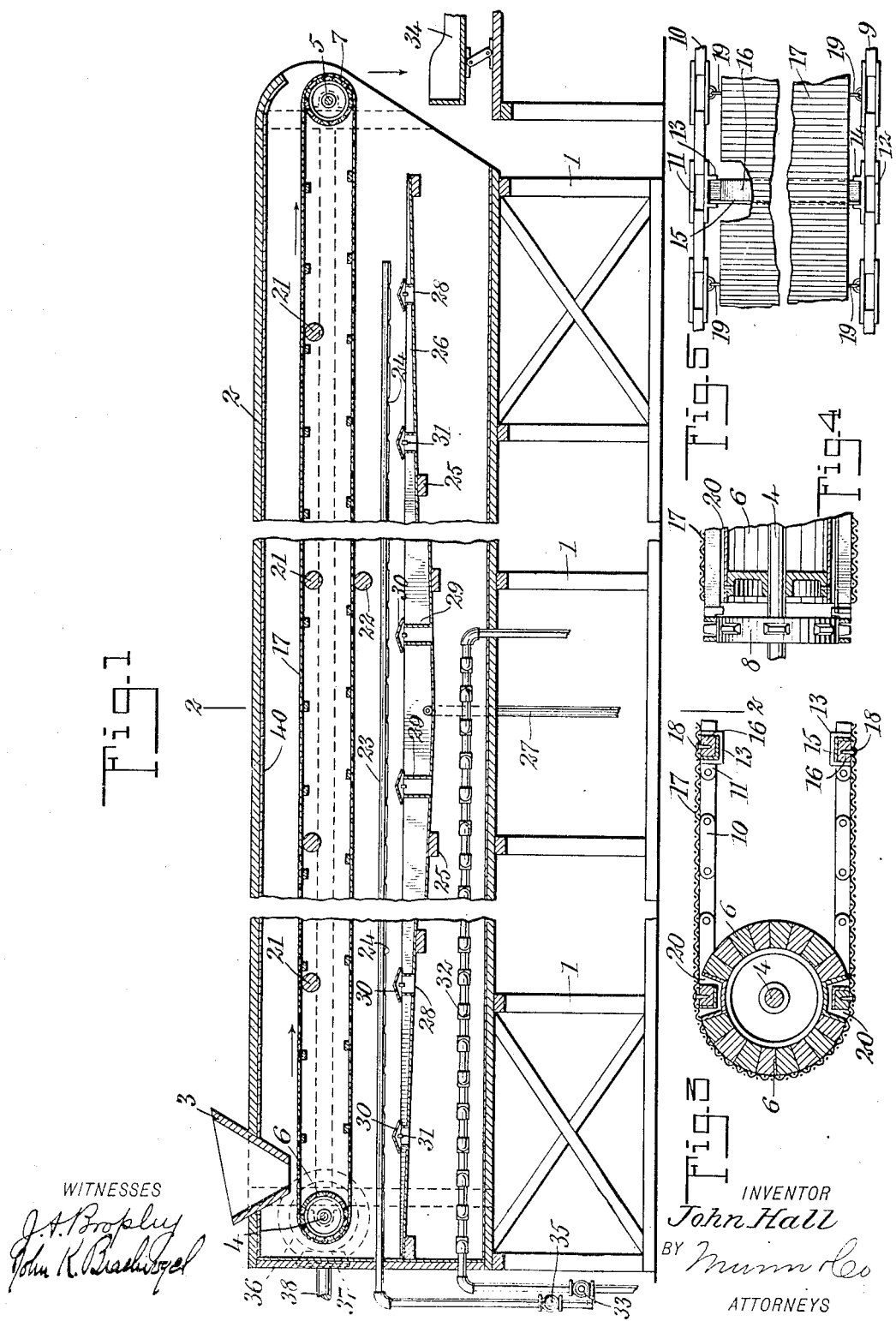
WITNESSES
INVENTOR
John Hall
BY
ATTORNEYS

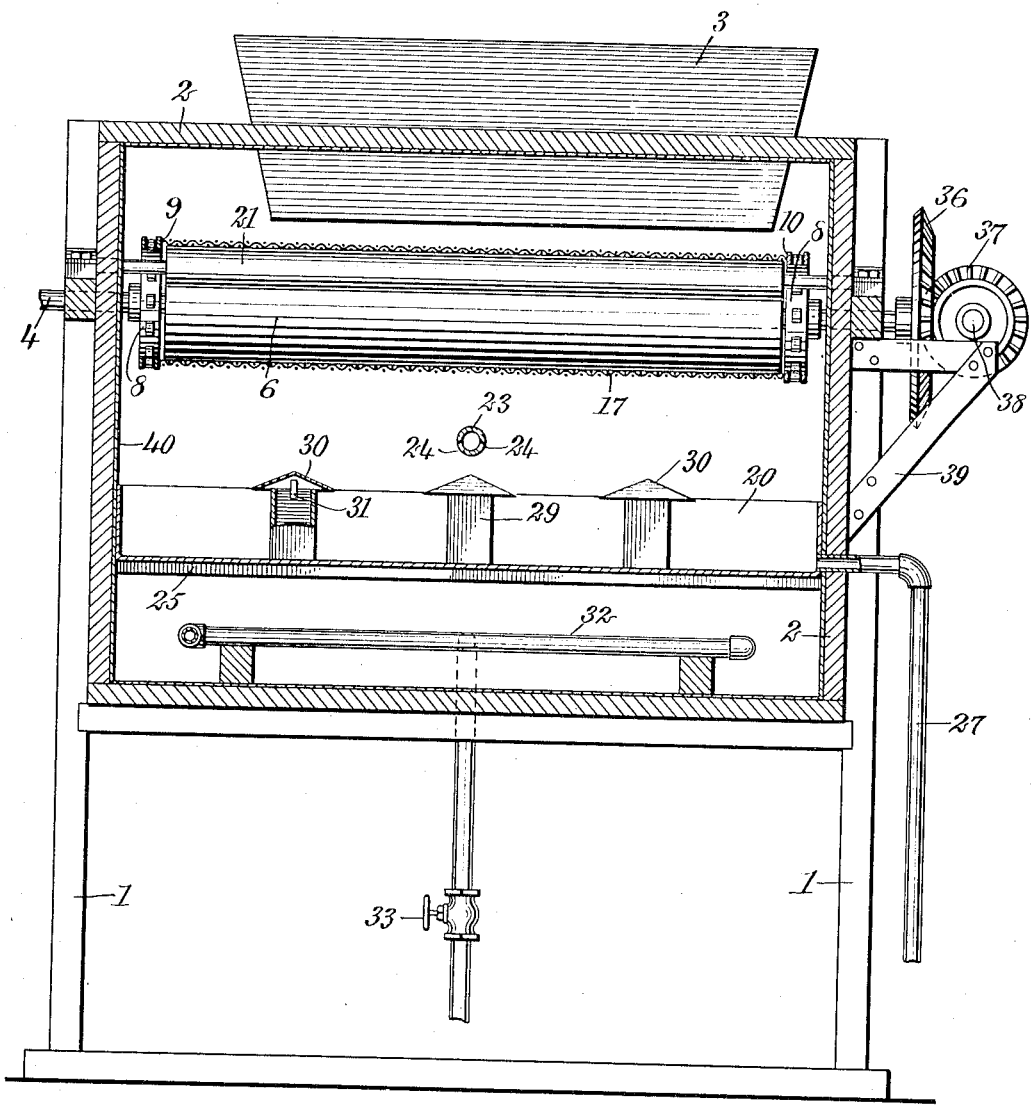

UNITED STATES PATENT OFFICE.

JOHN HALL, OF FRESNO, CALIFORNIA, ASSIGNOR TO UNITED STATES CONSOLIDATED SEEDED RAISIN COMPANY, A CORPORATION OF NEW YORK.

STEAMING APPARATUS.

No. 887,628.          Specification of Letters Patent.          Patented May 12, 1908.

Application filed March 21, 1907. Serial No. 363,669.

*To all whom it may concern:*

Be it known that I, JOHN HALL, a citizen of the United States, and a resident of Fresno, in the county of Fresno and State of California, have invented a new and Improved Steaming Apparatus, of which the following is a full, clear, and exact description.

This invention relates to steaming apparatus, and is particularly useful in connection with devices of this character used for preparing fruit and the like for the removal of the seeds therefrom preparatory to drying or preserving the fruit.

The object of the invention is to provide a steaming apparatus of simple, strong and durable construction in which the fruit is subjected to the action of dry steam for a suitable period, and from which the same is subsequently discharged in a proper condition for removing the seeds or pits.

A further object of the invention is to provide a device of this character in which the fruit is advanced in the apparatus while being subjected to the action of dry steam, in which the moisture from the condensation of the steam is constantly withdrawn, and in which the material is at the same time subjected to the action of heat from a steam coil or other similar and suitable appliance.

The invention consists in the construction and combination of parts to be more particularly pointed out hereinafter and fully set forth in the claims.

Reference is to be had to the accompanying drawings forming a part of this specification, and in which Figure 1 is a vertical longitudinal section, also showing portions broken away; Fig. 2 is an enlarged transverse vertical section on the line 2—2 of Fig. 1; Fig. 3 is a vertical longitudinal section of a detail of the advancing mechanism; Fig. 4 is a transverse vertical section of the same detail; and Fig. 5 is a plan view of a part of the device, showing portions broken away.

Before proceeding to a more detailed explanation of my invention, it should be understood that it is of advantage to subject fruit such as raisins, prunes and the like to certain processes, whereby the same is subjected to dry steam heat which renders the fruit adaptable to the seeding or pitting operation wherein the fruit is freed from the seeds or pits. Preferably, the steam should be as dry as possible, as the moisture tends to cause the seeds to adhere more closely to the enveloping material of the fruit. For this purpose I provide a collecting pan in my steaming apparatus, wherein the moisture from the condensing steam gathers and from which it may be drawn off constantly during the operation. Furthermore, I provide a steam coil which heats the device interiorly and is of assistance in maintaining the steam in a uniformly dry condition.

Referring more particularly to the drawings, 1 represents the supporting members of a suitable frame-work of wood or other proper material. Upon the supporting members 1 is mounted a casing 2 preferably of the form shown most clearly in Fig. 1 and of wood, sheet-iron or other suitable material. If the casing 2 is constructed of wood it should preferably have an inner lining 40 of tin or other suitable metal to insure that the casing is water-tight. The upper part of the casing 2 is provided near one end with a hopper 3 of suitable form for introducing the fruit or other material into the device. Rotatably mounted within the casing in suitable bearings are shafts 4 and 5 near opposite ends of the apparatus. Rigid with the shafts 4 and 5 are drums 6 and 7 constructed in the usual manner, of wood, metal or the like. Rigid with the shafts 4 and 5 and near the ends of the drums 6 and 7 are toothed wheels 8, two of the wheels being provided on each shaft, one near each end of each drum. Endless chains 9 and 10 are mounted on the toothed wheels and engage with the teeth of said wheels, certain of the links 11 and 12 of the opposite chains being provided with lateral extensions 13 and 14, to which are secured transverse angle-irons 15 by riveting or in any other suitable manner. The angle-irons are so arranged that the lower flange is horizontal and the other flange at right angles with the lower flange in a vertical position, as appears most clearly in Fig. 3. Secured to the angle-irons 15 by riveting, or any other way suitable for the purpose, are wooden slats 16 extending nearly from one chain to the opposite chain and having the upper surface flush with the edge of the vertical flange of the angle-iron. An endless conveyer belt 17, preferably of a screen material, is mounted over the drums 6 and 7 and is secured in place on the slats 16 by tacks 18 or other suitable means. Between adjacent slats the conveyer belt is secured to links of the opposite chains by means of clips 19. The drums 6 and 7 are provided with longitudinal recesses 20 to receive the angle-irons and slats as the chains pass over the drums. Within the casing at convenient points between the drums are rotatably mounted rollers 21 and 22 to support the belt which passes over them and to prevent its sagging.

Located underneath the conveyer belt 17 and extending into the casing is a steam pipe 23, communicating with a steam supply and provided on the side remote from the conveyer belt with a plurality of openings 24 to permit the escape of steam therefrom. The steam pipe 23 is further provided with a valve 35 by means of which the flow of steam from the pipe 23 can be suitably regulated. Suitably mounted upon supports 25 within the casing is a collecting pan 26 of sheet metal or the like and having its lowest point near the center, the ends being inclined upwards to render the collecting pan shallower near the extremities and to permit the condensed steam therein to flow near the central point, at which is located a discharge pipe 27 through which the collecting moisture may be drawn off as desired. The bottom of the collecting pan has a plurality of openings 28 provided with upwardly projecting tubular extensions 29 having the upper ends substantially flush with the edges of the pan. Mounted above the tubular extensions 29 are caps 30 projecting laterally beyond the extensions 29 and offset thereabove. The caps are held rigidly in place by means of fingers 31 secured to the caps and to the extensions 29. The caps are pyramidal in form with the apex axes upward in order to deflect any material falling from the conveyer, into the pan.

Mounted within the casing and underneath the pan 26 is a heating coil 32 adapted to communicate with the steam supply and having a valve 33 to regulate the amount of steam flowing therethrough. It will be understood that the heat from the heating coil rises and passes through the openings 28 in the collecting pan to the material on the conveyer belt thereabove, whereby this material is subjected not only to the steam flowing from the steam pipe 23 but as well to the heat rising from the heating coil. The arrangement of the openings, tubular extensions and caps is such that while the heat from the heating coil 32 can pass freely therethrough, any sugar dripping from the fruit upon the conveyer belt, or stems and other refuse falling therefrom cannot pass through the openings and fall upon the heating coil below, and thus the material is prevented from becoming tainted by the odor that would otherwise arise from burned sugar or refuse.

The end of the device opposite to that provided with the hopper 3 is left open and is cut away underneath as appears most clearly in Fig. 1, so that a shaker 34 or other conveying means can be arranged under the end of the conveyer belt to receive the material being discharged therefrom, and which conducts the same to the seeding apparatus. The shaft 4 extends laterally beyond the casing and has at one end a bevel-wheel 36 in mesh with a second bevel-wheel 37 rigid with a horizontal shaft 38 mounted upon supporting brackets 39. The shaft 38 may be driven in any suitable manner from the prime mover.

Having thus described my invention I claim as new and desire to secure by Letters Patent:

1. In a device of the class described, a casing, means for advancing the material within said casing, a steam pipe within said casing under said advancing means and adapted to permit the escape of steam on the side of said pipe remote from said advancing means, a collecting pan adapted to receive the condensed steam from said steam pipe and located thereunder, and a heating coil under said collecting pan.

2. A device of the class described, comprising a casing, a conveyer belt within said casing, means for driving said conveyer belt, a steam pipe within said casing adapted to permit the escape of steam from the side of said pipe remote from said conveyer belt, means for heating said casing interiorly, and a collecting pan adapted to receive the condensed steam from said steam pipe, said collecting pan having means for permitting the passage of heat therethrough, and means preventing the passage of liquid therethrough in the opposite direction, said collecting pan further having the bottom inclined from the ends toward the center.

3. A device of the class described, comprising a casing, drums mounted within said casing, a conveyer belt mounted upon said drums, means for driving one of said drums, a steam pipe in said casing and having an opening on the side remote from said belt to permit the escape of steam, a collecting pan under said steam pipe, and a heating coil on the side of said pan remote from said belt.

4. A device of the class described, comprising a casing, drums mounted within said casing, a conveyer belt mounted upon said drums, a roller to support said belt between said drums, means for driving one of said drums, a steam pipe under said belt and having an opening on the side remote from said belt to permit the escape of said steam, a collecting pan under said steam pipe, and a heating coil under said pan, said pan having means for permitting the passage of heat therethrough.

5. A device of the class described, comprising a casing, drums mounted within said casing, a conveyer belt mounted upon said drums, rollers to support said belt between said drums, means for driving one of said drums, a steam pipe under said belt and having an opening on the side remote from said belt to permit the escape of steam, a collecting pan under said steam pipe and a heating coil under said pan, said pan having an opening in the bottom thereof with an upwardly projecting tubular extension having an offset cap above said extension and extending therebeyond.

6. A device of the class described, comprising a casing, means for advancing material within said casing and means for discharging the material therefrom, a steam pipe within said casing adapted to permit the escape of steam on the side of said pipe remote from said advancing means, means for heating said casing interiorly, and a collecting pan between said steam pipe and said heating means, said pan having a plurality of openings in the bottom thereof, said openings having upwardly projecting tubular extensions, said extensions having mounted thereabove pointed caps over said extensions and with the edges extending laterally beyond said extensions.

7. In a device of the class described, a casing, drums mounted within said casing and having teeth, chains engaging with said teeth, a conveyer belt secured to said chains, means for driving one of said drums, a steam pipe within said casing adapted to permit the escape of steam on the side of the said pipe remote from said belt, and means for heating the said casing interiorly.

8. In a device of the class described, a casing, drums mounted within said casing, a belt mounted upon said drums and consisting of a screen material, a steam pipe within said casing adapted to permit the escape of steam on the side of said pipe remote from said belt, means for heating said casing interiorly and means for discharging condensed steam from said casing.

9. In a device of the class described, a casing, drums rotatably mounted within said casing, toothed wheels rigid with said drums, chains mounted upon said toothed wheels, transverse slats secured to said chains, a belt secured to said transverse slats and passing over said drums, said drums having longitudinal recesses adapted to receive said slats, means for driving one of said drums, a steam pipe within said casing adapted to permit the escape of said steam on the side of said pipe remote from said belt, means for heating said casing interiorly and means for discharging condensed steam from said casing.

10. In a device of the class described, a casing, drums rotatably mounted within said casing, toothed wheels rigid with said drums, chains mounted upon said toothed wheels, transverse slats secured to said chains, a belt secured to said transverse slats and passing over said drums, said drums having longitudinal recesses adapted to receive said slats, means for driving one of said drums, a steam pipe within said casing adapted to permit the escape of said steam on the side of said pipe remote from said belt, a heating coil underneath said steam pipe, and a collecting pan between said steam pipe and said heating coil, said collecting pan having an opening in the bottom thereof, said opening having an upwardly projecting tubular extension provided with an offset cap thereabove and projecting laterally therebeyond.

In testimony whereof I have signed my name to this specification in the presence of two subscribing witnesses.

JOHN HALL.

Witnesses:
   D. A. CASLINE,
   GEO. B. GRAHAM.